United States Patent [19]

Holman et al.

[11] 4,386,558

[45] Jun. 7, 1983

[54] CONVECTION COOKING EQUIPMENT

[76] Inventors: J. Harrison Holman, P.O. Box 5, Kennebunk, Me. 04043; Jay C. Holman, 40 Montrose Ave., Portland, Me. 04103

[21] Appl. No.: 233,912

[22] Filed: Feb. 12, 1981

[51] Int. Cl.³ .............................................. A47J 37/08
[52] U.S. Cl. ........................................ 99/386; 99/401; 99/447; 126/21 A; 219/531
[58] Field of Search ............ 99/401, 447, 386, 443 C; 219/400, 460, 531; 126/21 A

[56] References Cited

U.S. PATENT DOCUMENTS

| | | | |
|---|---|---|---|
| 3,313,917 | 4/1967 | Ditzler | 219/400 |
| 3,485,229 | 12/1969 | Gilliom | 219/400 |
| 3,783,219 | 1/1974 | Tateda | 219/400 |

*Primary Examiner*—Billy J. Wilhite
*Attorney, Agent, or Firm*—William Nitkin

[57] ABSTRACT

Disclosed is a commercial convection cooking equipment having an outer casing and inner food cooking chamber forming channel(s) therebetween with air intake vent and fan to force air through such channel(s) to cool portions of the outer casing and then when such air is heated, to redirect the hot air back into the food cooking chamber.

5 Claims, 3 Drawing Figures

CONVECTION COOKING EQUIPMENT

BACKGROUND OF THE INVENTION

1. Field of the Invention

The equipment of this invention resides in the area of cooking devices and more particularly relates to commercial convection cooking equipment incorporating an internal air flow system designed to cool outside surfaces of the unit and to redirect the subsequently heated air back into the cooking area.

2. History of the Prior Art

Commercial cooking equipment usually provides heating elements within an area and food movement means or placement means in the vicinity of the heating elements to cause the cooking of the food thereupon. Fans directing cool air from outside the unit direct such air against selected electrical parts to avoid their overheating. Forced convection ovens are also well known which usually include a fan within the cooking chamber to move the heated air around the food. This process speeds up the cooking process. Some commercial cooking equipment becomes extremely hot on its outside surface and is dangerous to touch.

SUMMARY OF THE INVENTION

It is an object of this invention to provide an improved cooking equipment having an air movement means designed both to cool the outer casing of the equipment along with other working elements of the unit and to redirect the then heated air back into the food cooking area. It is desirable to cool the exterior of commercial cooking equipment which frequently reaches extremely high temperatures and is dangerous to touch. The air used for such cooling process instead of being vented to the exterior, is then redirected back into the food cooking area so as to add heat that would have been otherwise wasted thereby effectively increasing the energy utilization efficiency of the cooking unit in comparison with conventional commercial cooking equipment.

DESCRIPTION OF THE PREFERRED EMBODIMENT(S)

Figure 1:
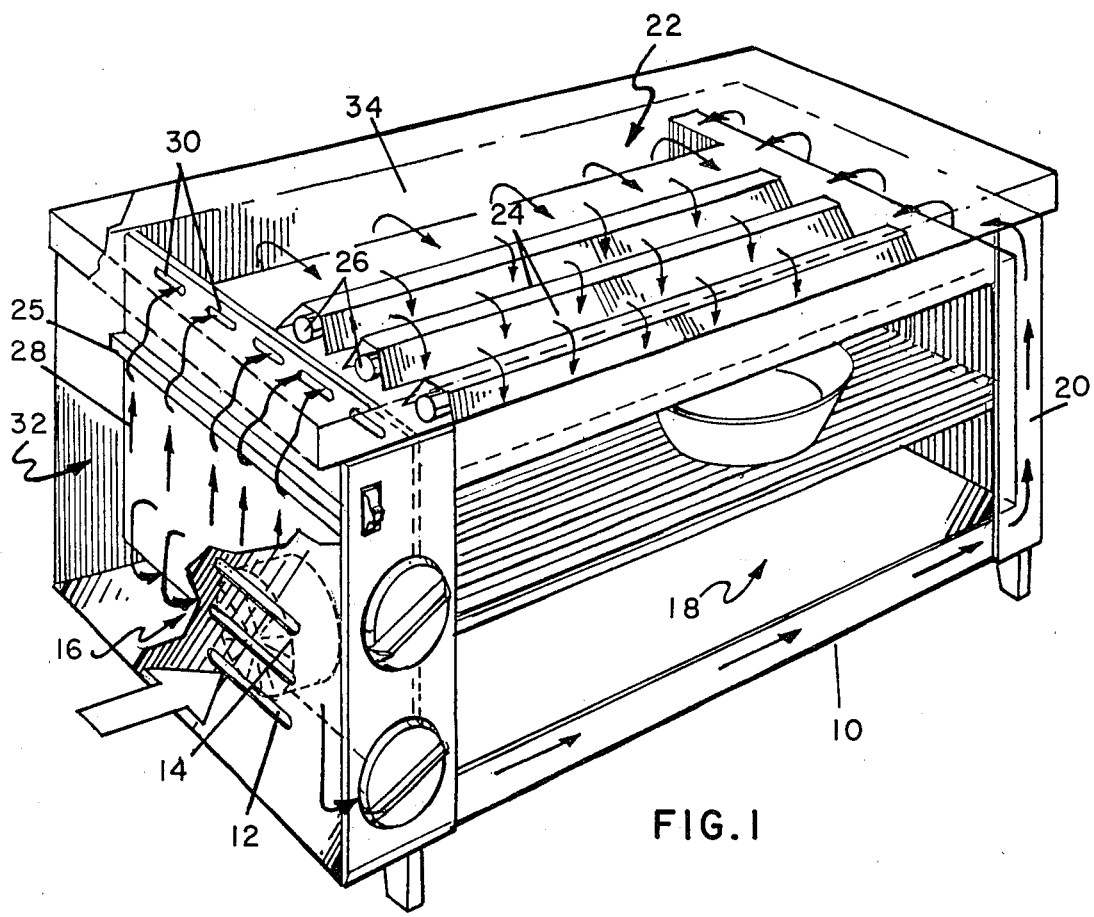
FIG. 1 illustrates a cutaway view of a finishing oven incorporating the system of this invention.

FIG. 1 is a perspective cutaway view showing air intake vent 12 of finishing oven/cheese melter 10 behind which is fan member 14 operating to force air from outside the unit through a series of channels. Fan 14 forces air coming from outside the unit through air intake vent 12 downward to a bottom channel 16 which extends under food cooking area 18 and then up side channel 20 on the opposite side of the unit and into top channel 22 where the air is redirected back through spaces 24 between heating elements 26 which can be fused quartz radiant heaters or equivalent. The air then passes into food cooking area 18. A second smaller flow 28 of air passes through apertures 30 defined at the top of the first side channel 32 encompassing the side around the air intake vent 12 and fan 14 to cool the area located above channel 32 and the adjoining side of top channel 22 of the cooking unit which the air directed along the bottom channel may not reach to sufficiently cool thereby avoiding the development of hot spots therein. The air also passes from bottom channel 16 up rear channel 34 formed in the back of the unit with such air traveling up therethrough and then across the top channel 22 and back through spaces 24 between heaters 26. The width and height of the channels corresponds closely to the exterior side size which they are to cool. One must be careful not to force too much air too quickly through the channels which increased air flow would not allow the air to heat sufficiently while cooling the outside casing and which cooler air when directed into food cooking area 18 would retard the cooking process. It has been found that the fan, channel depth and baffles 25 must be adjusted so that the air as it is heated running along the bottom, side and top channels must reach at least 350° F. in most toasters and cheese melters and that a temperature of 400° F. is preferable before the air is redirected back into food cooking area 18.

Figure 2:
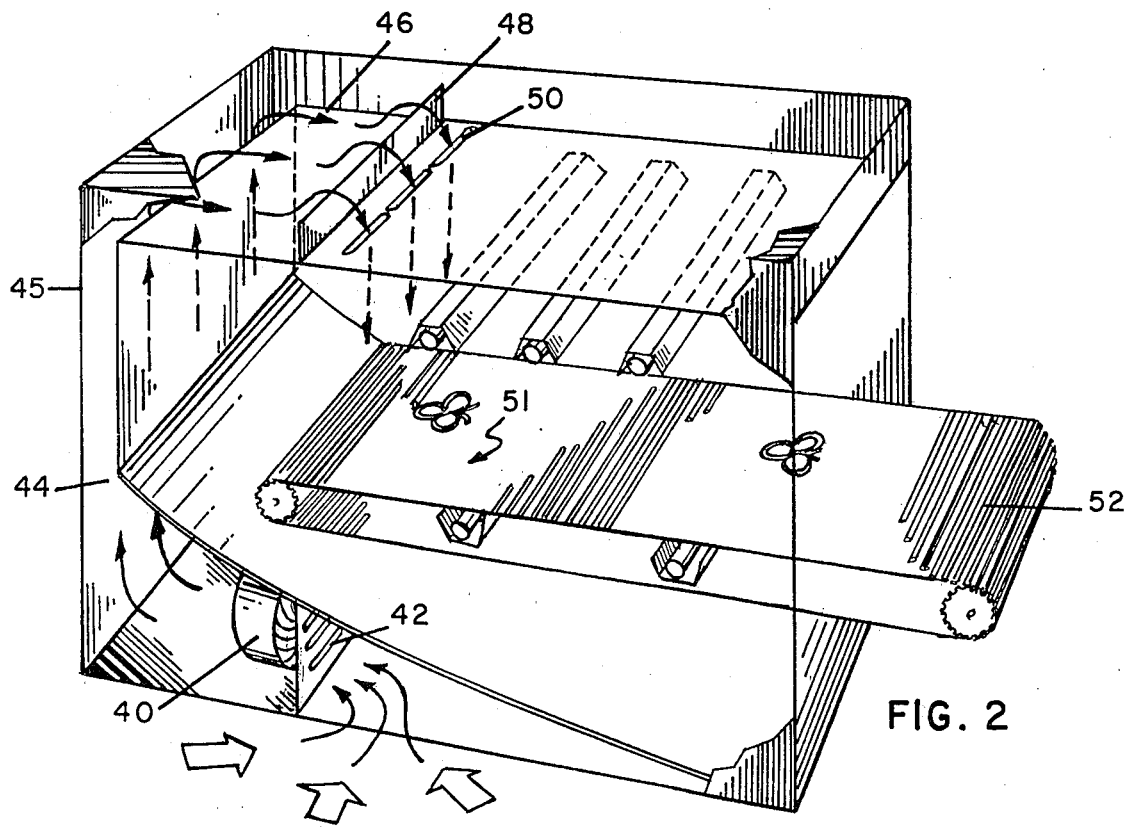
FIG. 2 illustrates the system of this invention incorporated within a conveyor pretzel baker.

FIG. 2 illustrates a second embodiment of this invention wherein the system of this invention is utilized in a conveyor pretzel baker with fan 40 blowing air, received through air intake vent 42 located on the bottom of the unit, toward the rear of the unit and up rear channel 44, the outside wall 45 of which is desired to be cooled so that the unit can be safely placed against a wall. The air travels up rear channel 44 across top channel 46, over baffle 48 and through louver 50, into the food cooking area 51 in which the pretzels are carried by conveyor belt 52. Baffle 48 is used to slow the air circulation to cause a turbulance of air within top channel 46 which prevents too much hot air from immediately blowing down onto the pretzels which would otherwise cook the outsides faster than the insides causing the pretzels to explode due to the expanding dough within the quickly cooked outer crust. Baffle 48 has been found to function well as a ⅜ inch high strip extending along the front of louver 50. The controls of the unit can also be cooled at the same time as the rear wall 45 of the unit if they are located in an area where the fan circulates air.

Figure 3:
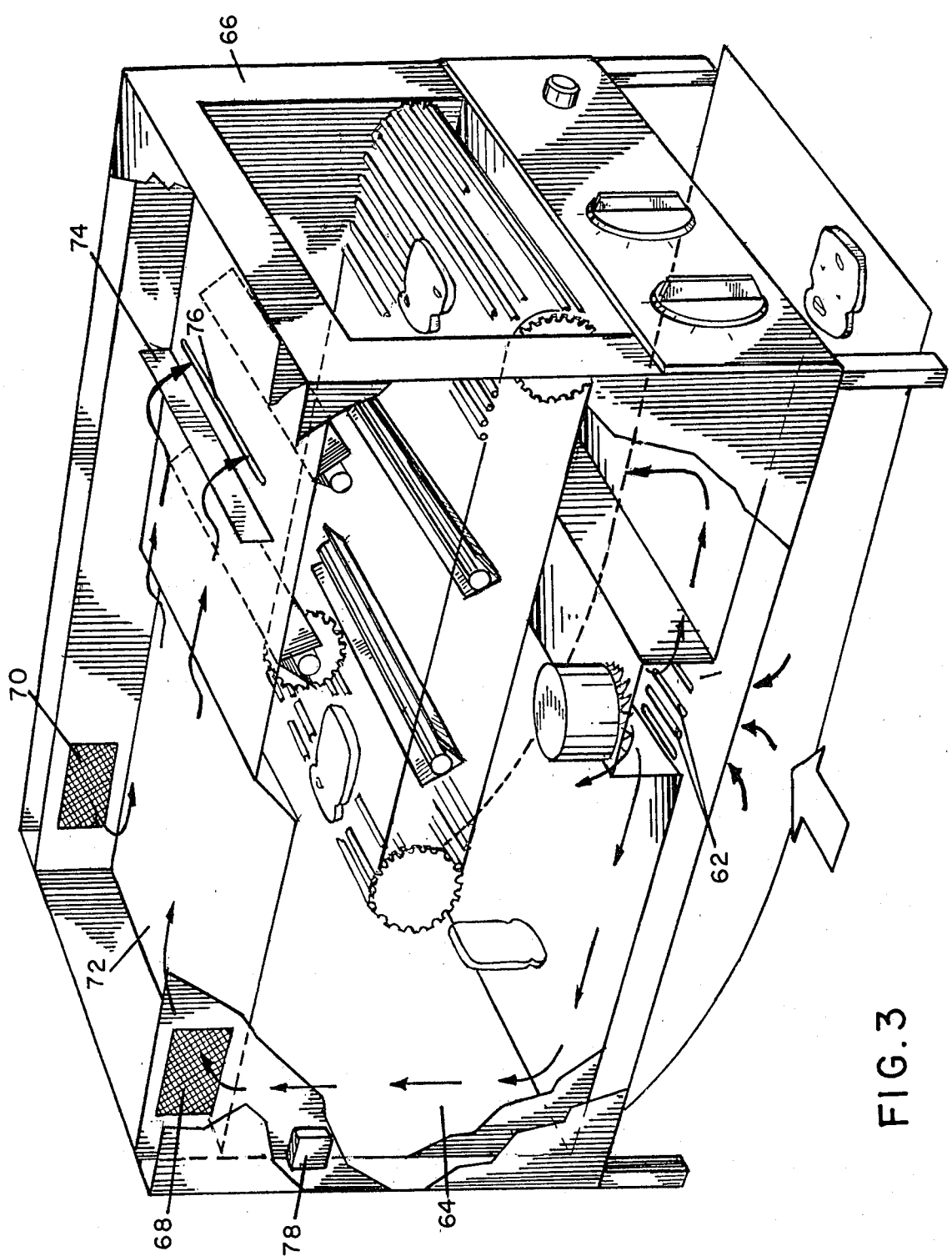
FIG. 3 illustrates the system of this invention incorporated within a conveyor toaster.

FIG. 3 illustrates the third example of the air movement system of this invention incorporated within a conveyor toaster wherein fan 60 directs air from the bottom of the unit through a transverse channel 62 out to channels 64 and 66 encompassing the sides of the unit, the outside walls of which are desired to be cooled. The air passes up through vents 68 and 70 in the inner side of side channels 64 and 66, respectively, into top channel 72, over baffle 74 and then down through vent 76 into the food cooking area. Thermostat 78 can control the operation of fan 60, for example, as illustrated in the conveyor toaster of FIG. 3. When the temperature reaches 150° F. on the inner wall of the side channel, fan 60 will turn on to cool the side walls. Also additional heat can be added to the air as it enters the food cooking area by means of auxiliary heaters if desired.

Although the present invention has been described with reference to particular embodiments, it will be apparent to those skilled in the art that variations and modifications can be substituted therefor without departing from the principles and spirit of the invention.

We claim:

1. Food cooking equipment comprising:
   an outer casing;

an inner food cooking chamber;

a heat source adapted to cook food placed inside said inner food cooking chamber;

at least one channel defined between said inner food cooking chamber and a corresponding portion of said outer casing;

air movement means adapted to force air through said channel associated with said portion of said outer casing adapted to cool said portion of said outer casing; and means for directing said air used for cooling said portion of said outer casing once heated by proximity to said inner food cooking chamber back into said inner food cooking chamber to assist in the food cooking process.

2. The equipment of claim 1 further including:

air intake means defined in a portion of said outer casing adapted to allow air from outside said equipment to be drawn therethrough into said channel by said air movement means.

3. The equipment of claim 2 further including:

a first channel defined in the left side of said casing;

a second channel defined in the right side of said casing;

a third channel defined in the bottom of said casing interconnecting said first and second channels;

a fourth channel defined in the rear of said casing interconnected to said third channel;

a fifth channel defined in the top of said casing interconnected to said first, second and fourth channels;

said air movement means adapted to draw air from outside said equipment through said air intake means and to force said air through said first, second, third, fourth and fifth channels; and wherein said means for directing said air used for cooling said outer casing once heated by proximity to said inner food cooking chamber back into said inner food cooking chamber comprises at least one food cooking area entry vent defined in said inner food cooking chamber within said fifth channel adapted to receive said forced air from said first, second, third, fourth and fifth channels and to direct it into said food cooking chamber.

4. The equipment of claim 2 adapted to be utilized as a conveyor baker for pretzels and the like, further including:

a conveyor mounted in said cooking chambers;

a first channel defined along the back of said equipment;

a second channel defined along the top of said equipment; and a food cooking area air entry vent adapted to receive air forced through said first and second channels and direct it into said food cooking area.

5. The equipment of claim 2 adapted to be utilized as a conveyor baker, further including:

a conveyor mounted in said cooking chamber;

a first channel defined in the left side of said equipment;

a second channel defined in the right side of said equipment;

a third channel defined in the top of said equipment;

duct means from said first and second channels into said third channel; and an air entry vent adapted to receive said air from said first and second channels through said third channel to direct it into said food cooking area.

* * * * *